US010904617B1

(12) United States Patent
Labarre et al.

(10) Patent No.: US 10,904,617 B1
(45) Date of Patent: Jan. 26, 2021

(54) SYNCHRONIZING A CLIENT DEVICE WITH MEDIA CONTENT FOR SCENE-SPECIFIC NOTIFICATIONS

(71) Applicant: Amazon Technologies, Inc., Seattle, WA (US)

(72) Inventors: Thibaut Labarre, Seattle, WA (US); Yiwen Chang, Seattle, WA (US); Marion Helene Desmazieres, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 688 days.

(21) Appl. No.: 14/625,933

(22) Filed: Feb. 19, 2015

(51) Int. Cl.
*H04N 21/454* (2011.01)
*H04N 21/435* (2011.01)
*H04N 21/462* (2011.01)
*H04N 21/81* (2011.01)

(52) U.S. Cl.
CPC ......... *H04N 21/454* (2013.01); *H04N 21/435* (2013.01); *H04N 21/462* (2013.01); *H04N 21/8126* (2013.01)

(58) Field of Classification Search
CPC .................................................. H04N 21/2552
See application file for complete search history.

(56) References Cited

U.S. PATENT DOCUMENTS 7,540,009 B1 * 5/2009 Bryant .................. H04N 7/163 725/136
8,607,295 B2 * 12/2013 Bhatia .................. H04N 21/252 725/133
8,763,023 B1 * 6/2014 Goetz .................. H04N 21/233 725/20
2005/0144455 A1 * 6/2005 Haitsma ............ G06F 17/30758 713/176
2007/0250898 A1 * 10/2007 Scanlon ............. G06K 9/00771 725/135
2009/0037961 A1 * 2/2009 Green .................... H04N 7/173 725/87
2009/0044229 A1 * 2/2009 Taylor ................. H04L 67/1095 725/62

(Continued)

*Primary Examiner* — Mushfikh I Alam
(74) *Attorney, Agent, or Firm* — Thomas | Horstemeyer, LLP

(57) ABSTRACT

Disclosed are various embodiments for syncing a client device with media content for scene-specific notifications. A computing environment is employed to cause a sync to occur between a client device and media content being rendered by a media device using an audio signal or a video signal captured by the client device during a playback of the media content. A current scene of the media content being rendered on the media device is determined by comparing the audio signal or the video signal to at least one digital fingerprint stored in a data store. The computing environment then identifies content in a plurality of upcoming scenes occurring later in the playback than the current scene by analyzing at least one tag descriptive of the content in the plurality of upcoming scenes. If at least one of the upcoming scenes satisfies criteria predefined by a user of the client device, a command is sent to perform a notification event to be performed by the client device within a predefined temporal range of the at least one of the upcoming scenes.

1 Claim, 12 Drawing Sheets

(56) References Cited

U.S. PATENT DOCUMENTS

| | | | | |
|---|---|---|---|---|
| 2009/0123025 | A1* | 5/2009 | Deng | G06K 9/00711 382/100 |
| 2009/0288131 | A1* | 11/2009 | Kandekar | G06F 17/30029 725/133 |
| 2011/0078736 | A1* | 3/2011 | Thomas | H04N 21/252 725/40 |
| 2013/0086601 | A1* | 4/2013 | Adimatyam | H04N 21/23424 725/1 |
| 2013/0268954 | A1* | 10/2013 | Hulten | H04N 21/442 725/12 |
| 2013/0298146 | A1* | 11/2013 | Conrad | H04N 21/252 725/12 |
| 2014/0075470 | A1* | 3/2014 | Oh | H04N 21/4307 725/32 |
| 2014/0130099 | A1* | 5/2014 | Kunisetty | H04N 21/4667 725/50 |
| 2014/0215535 | A1* | 7/2014 | Elliott | H04N 21/2387 725/81 |
| 2014/0331265 | A1* | 11/2014 | Mozell | H04N 21/2668 725/93 |
| 2015/0019976 | A1* | 1/2015 | Lee | H04W 52/0254 715/733 |
| 2015/0033277 | A1* | 1/2015 | Li | H04N 21/4307 725/116 |
| 2015/0113557 | A1* | 4/2015 | Kim | H04N 21/8153 725/32 |
| 2015/0245103 | A1* | 8/2015 | Conte | H04N 21/47815 725/60 |

* cited by examiner

SYNCHRONIZING A CLIENT DEVICE WITH MEDIA CONTENT FOR SCENE-SPECIFIC NOTIFICATIONS

BACKGROUND

Media content, including movies, television shows, and music albums, comprise scenes or tracks with adult content, graphic language, etc. For example, a movie may have scenes with that are not appropriate for viewers younger than a certain age. Additionally, adult viewers of media content may not be fond of scenes having particular content.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
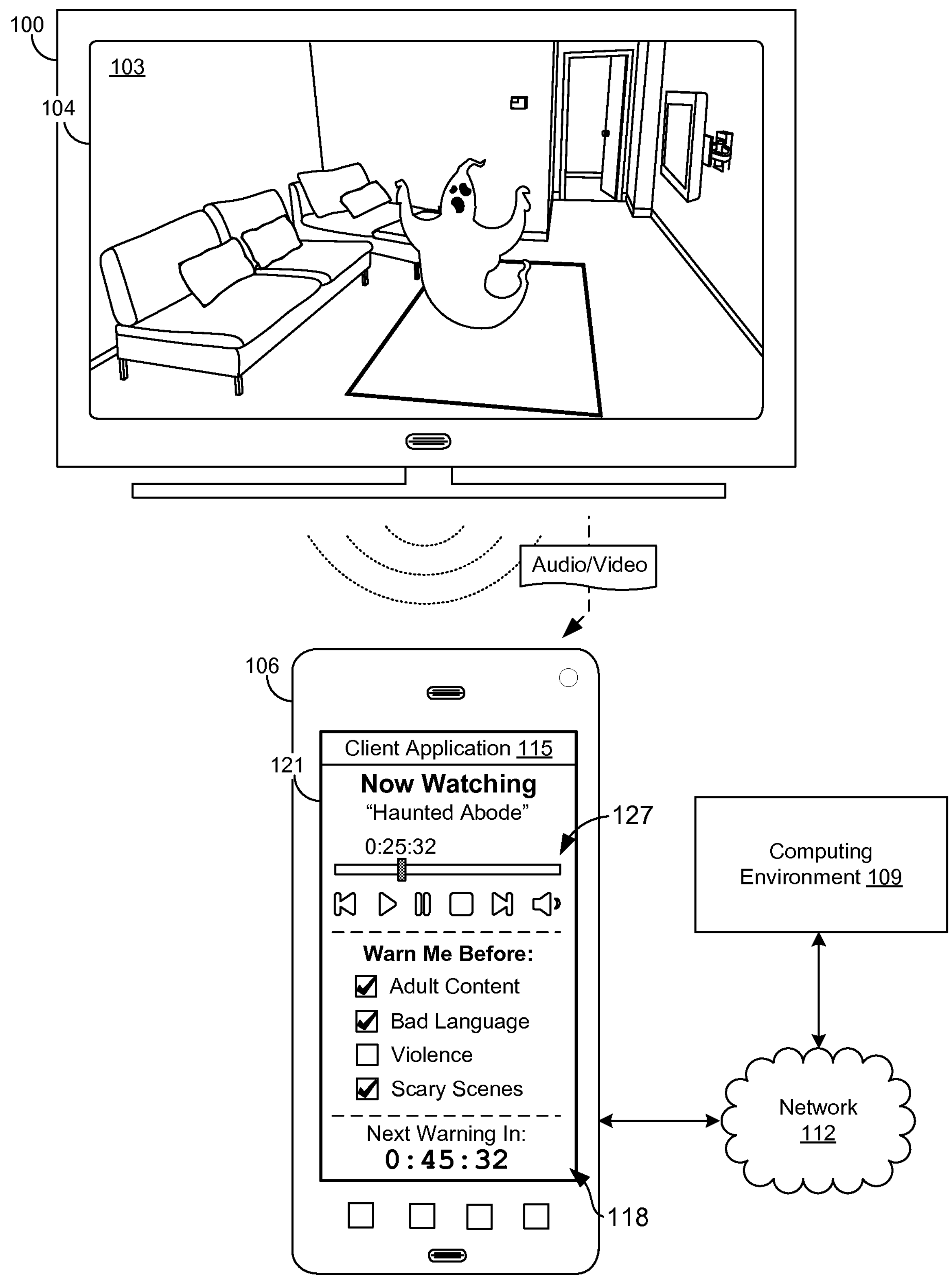
FIG. 1 is a drawing of an example user interface rendered by a client device in association with a media device according to various embodiments of the present disclosure.

The present disclosure relates to synchronizing a client device with media content for scene-specific notifications. As noted above, media content, including movies, television shows, and music albums, comprise scenes or tracks with adult content, graphic language, etc. For example, a movie may have scenes that are not appropriate for viewers younger than a certain age. Additionally, adult viewers of media content may not be fond of scenes having particular content. Traditionally, the only option for a viewer to avoid undesirable content was to skip the scene or cover his or her eyes.

According to various embodiments as will be described herein, a computing environment is employed to synchronize a client device with media content being shown in a media device. The media content may include a movie, an episode of a television show, a song, or other similar content. The synchronization is performed using at least one of an audio signal or video signal captured by the client device during a playback of the media content. Using the audio signal or the video signal, a current scene a user is watching is determined by comparing the audio signal or the video signal to digital fingerprints stored in memory. Knowing a time in the playback of media content, upcoming scenes may be analyzed to determine types of content included in the upcoming scenes. If the upcoming scenes satisfy criteria predefined by a user of the client device, a command or a request is communicated to the client device to perform a notification event, such as causing the client device to vibrate, rendering a notification in a display of the client device, and/or causing a tone or audio signal to be emitted from a speaker of the client device.

As a non-limiting example, a user may use his or her client device (e.g., smartphone, smart watch, tablet, or laptop) to define content undesirable for the user including, but not limited to, adult content, violence, bad language, scary or graphic scenes, etc. The computing environment may store the defined content in memory in association with a user account. When a user is in proximity to a media device rendering media content, such as a television showing a movie, the user's client device may capture audio (e.g., a recording) and/or video (e.g., a picture or a video file) emitted from the television. Using the audio and/or video, the computing environment may first determine a name or identity of the media content actively being consumed by the user.

Knowing the identity of the media content, the computing environment may determine a current scene of the media content currently being watched by the user. This may be used to synchronize the user's client device with the media content. For example, if a user is fifteen minutes into a movie, a timer in the client application on the client device may sync to the fifteen minutes. The timer may be used to generate notification events at certain times of the movie, as will be discussed in greater detail below. In the following discussion, a general description of a system for synchronizing a client device with media content for scene-specific notifications and its components is provided, followed by a discussion of the operation of the same.

With reference to FIG. 1, a media device 100 is shown rendering media content 103 in a media device display 104. In various embodiments, the media device 100 may include a television, a computer display, a laptop display, or any other display suitable for rendering media content 103. Further, the media device 100 may include a network-enabled device, such as a smart television or a television coupled with a network-enabled digital media player (e.g., a HDMI dongle, video game console, or other similar network appliance). As noted above, the media content 103 may include a movie, one or more episodes of a television show, music, etc. A client device 106, in proximity of the media device 100, may be capable of detecting audio and/or video emitted from the media device 100. For example, the client device 106 may be capable of capturing audio from a movie being shown on a television using a microphone or a similar sensor. Similarly, the client device 106 may be capable of capturing video (e.g., a picture or a video recording) from a television show being shown on the television using a front-facing or rear-facing camera.

The audio and/or video captured by the client device 106 may be communicated to a computing environment 109 over a network 112. Using the audio signal or the video signal, a scene a user is currently watching (hereinafter current scene) may be used to synchronize the client device 106 with the media content 103. Alternatively, assuming the media device 100 comprises a network-enabled device employed to stream the media content 103 from a streaming service, the media content 103 being streamed by the user may be analyzed to determine a scene the user is currently watching. Further, the audio signal or the video signal may be used to identify upcoming scenes in the media content 103. By analyzing the upcoming scenes, the computing environment 109 may generate notification events that warn a user of an upcoming scene having undesirable content.

To this end, a client application 115 may be executed on the client device 106 that oversees the capture of the audio signal and/or the video signal. Additionally, the client application 115 may facilitate rendering a user interface 118 in a display 121 of the client device 106. For example, when the client application 115 is synchronized with the media content 103, the user interface 118 may prompt the user to provide a selection of undesirable content for which the user desires to be warned. In the non-limiting example of FIG. 1, the user may select "adult content," "bad language," "violence," "scary scenes," or other types of content. By knowing a current scene of the media content 103, the computing environment 109 may identify upcoming scenes with content selected by the user. Before an upcoming scene of the media content 103 is shown in the media device 100, the client application 115 may perform one or more notification events in order to warn or otherwise get the attention of the user. For a particular scene having content selected by the user, the notification event may be performed at a start of the scene or a predefined amount of time before the start of the scene (e.g., three seconds before the start of the scene).

In various embodiments, the client application 115 may include playback control functionality. For example, the user interface 118 may include a playback controls component 127 capable of starting playback of the media content 103 on the media device 100, pausing or stopping playback of the media content 103, adjusting a volume level of the media device 100, rewinding or fast forwarding, etc. To this end, the client device 106 may sync with the media content 103 through a connection made between the client device 106 and the media device 100. For example, the client device 106 may create a Bluetooth®, ZigBee®, or wireless fidelity (Wi-Fi) connection with the media device 100 or a device connected to a display component of the media device 100.

Figure 2:
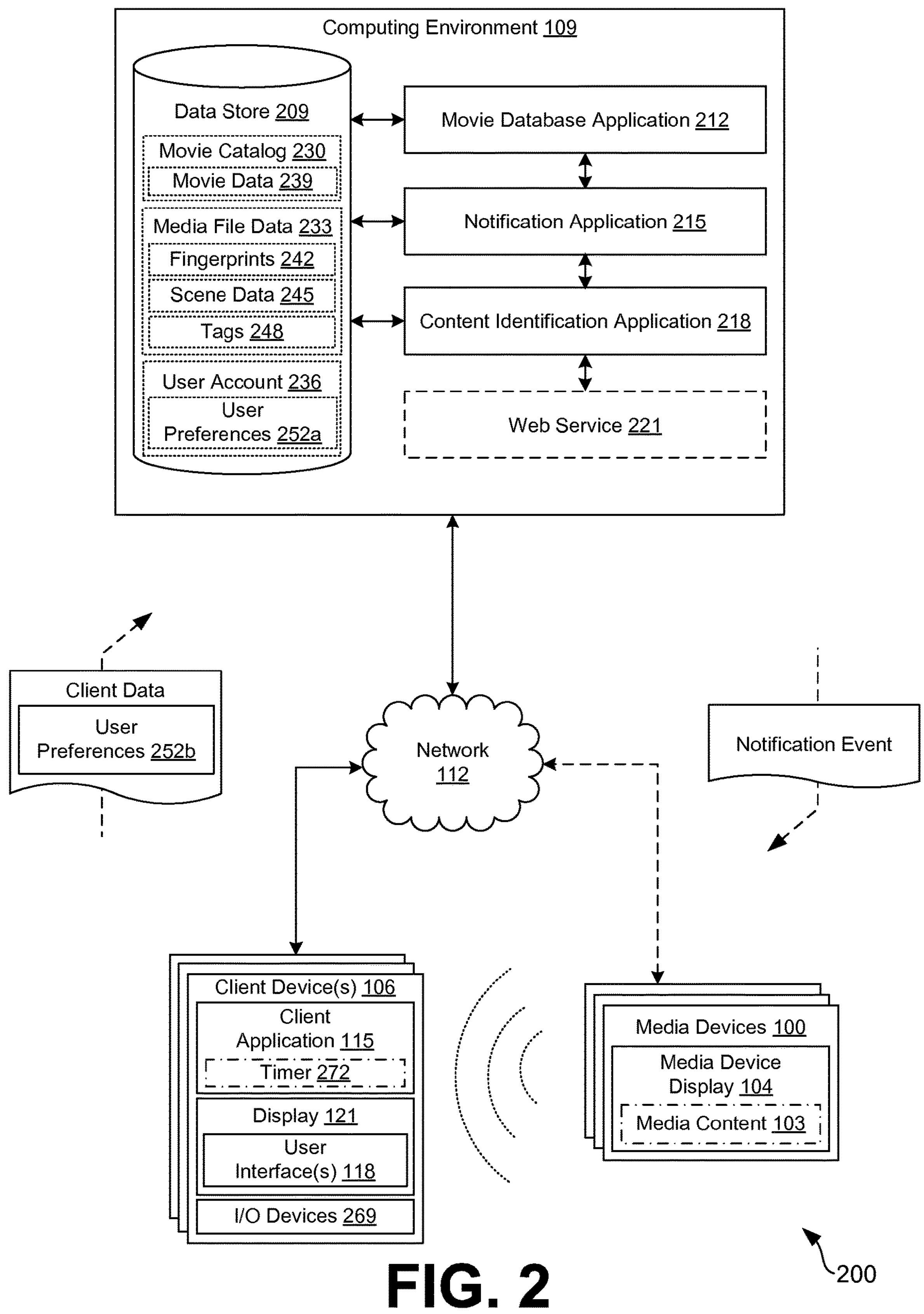
FIG. 2 is a drawing of a networked environment comprising the client device and media device of FIG. 1 according to various embodiments of the present disclosure.

Moving on to FIG. 2, shown is a drawing of a networked environment 200 according to various embodiments of the present disclosure. The networked environment 200 includes a computing environment 109 and a client device 106, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. In addition, the client device 106 may communicate with a media device 100 using Bluetooth®, ZigBee®, near-field communication (NFC), or other suitable communication medium to perform a synchronization of the client device 106 with the media content 103.

The computing environment 109 may comprise, for example, a server computer or any other system providing computing capability. Alternatively, the computing environment 109 may employ a plurality of computing devices that may be arranged, for example, in one or more server banks or computer banks or other arrangements. Such computing devices may be located in a single installation or may be distributed among many different geographical locations. For example, the computing environment 109 may include a plurality of computing devices that together may comprise a hosted computing resource, a grid computing resource and/or any other distributed computing arrangement. In some cases, the computing environment 109 may correspond to an elastic computing resource where the allotted capacity of processing, network, storage, or other computing-related resources may vary over time.

Various applications and/or other functionality may be executed in the computing environment 109 according to various embodiments. Also, various data is stored in a data store 209 that is accessible to the computing environment 109. The data store 209 may be representative of a plurality of data stores 209 as can be appreciated. The data stored in the data store 209, for example, is associated with the operation of the various applications and/or functional entities described below.

The components executed on the computing environment 109, for example, include a movie database application 212, a notification application 215, a content identification application 218, a web service 221, and other applications, services, processes, systems, engines, or functionality not discussed in detail herein.

The movie database application 212 is executed to generate user interface data such as web pages or other types of network content that are provided to client devices 106 for the purposes of viewing information associated with movies, television shows, or other similar content. The information includes production information, listings of actors, actresses, and characters, filming locations, etc. In various embodiments, the movie database application 212 also performs various backend functions in order to facilitate the online purchase of media content 103 (e.g., movies, music, television shows). In various embodiments, the movie database application 212 facilitates collaboration among users to create and/or vet tags describing scenes of media content 103. For example, the network site may enable users to vote on whether a given tag is representative of a scene.

The content identification application 218 is executed to identify a title of media content 103 and/or identify a particular scene in media content 103 using an audio signal and/or video signal captured by the client device 106. For example, assuming the client device 106 communicates an audio signal to the computing environment 109, the content identification application 218 may convert the audio signal into a data object comprising frequency, amplitude, and time. The frequency, amplitude, and time may be compared to a library of data objects (e.g., fingerprints) to attempt to find a match in the library comprising the same or similar frequency, amplitude, and time.

The notification application 215 is executed to perform a variety of functions including synchronizing a client device 106 with media content 103 being rendered by a media device 100 as well as generating notification events to be sent to client devices 106. To this end, the notification application 215 interfaces with the content identification application 218 to identify a scene of media content 103 being shown to a user of the client device 106 and to identify potentially undesirable content in upcoming scenes. If the upcoming scenes in the media content 103 comprise content designated by the user as being undesirable, the notification application 215 may generate a warning or a notification to send to the client device 106 to be shown to the user at a predefined time interval.

The web service 221 is executed to provide a medium for communication between the computing environment 109 and/or the client device 106 over the network 112. The web service 221 may comprise a web-based application programming interface (API) embodied in software that facilitates programmatic service calls (e.g., API calls) made by the client application 115 to communicate with the movie database application 212, the notification application 215, the content identification application 218, and/or other services or applications not described herein. According to various embodiments, the web-based API may further comprise a representational state transfer (REST) API, a simple object access protocol (SOAP) API, or another suitable API.

The data stored in the data store 209 includes, for example, a movie catalog 230, media file data 233, data associated with user accounts 236, and potentially other data. The movie catalog 230 includes movie data 239, which may comprise a listing of movies, television shows, music videos, or other similar content. The movie data 239 also includes information associated with such content, such as data associated with characters, scenes, snapshots, plots, synopses, reviews, actors, actresses, writers, directors, production information, box office sales, etc.

The media file data 233 includes a library of digital fingerprints 242, scene data 245, and a plurality of tags 248 describing a particular scene of media content 103. The library of digital fingerprints 242 includes information that uniquely identifies a source of an audio signal and/or video signal captured by the client device 106. The library of digital fingerprints 242 may include a fingerprint for each of a plurality of scenes for a movie, television show, or other media content 103. The scene data 245 may include data associated with a scene including data associated with characters, plots, synopses, reviews, actors, actresses, writers, directors, production information, box office sales, etc. The tags 248 include data descriptive of a particular scene. In various embodiments, the scene data 245 and/or the tags 248 are submitted and/or vetted by users of the movie database application 212.

The data associated with the user account 236 includes user preferences 252*a*. User preferences 252*a* are analyzed to identify tags 248 of potential undesirable content for which the user wants to be warned. In addition, the user preferences 252*a* may include preferences regarding how a user wants to be notified to be warned on upcoming undesirable content. For example, the user preferences 252*a* may specify that the user wants to be notified three seconds before a scene having undesirable content. In addition, the user may specify that the notification cause the client device 106 to vibrate, render a notification in a display 121 of the client device 106, and/or cause a tone or audio signal to be emitted from a speaker of the client device 106.

The client device 106 is representative of a plurality of client devices 106 that may be coupled to the network 112. The client device 106 may comprise, for example, a processor-based system such as a computer system. Such a computer system may be embodied in the form of a desktop computer, a laptop computer, personal digital assistants, cellular telephones, smartphones, set-top boxes, music players, tablet computer systems, game consoles, electronic book readers, smart watches, virtual reality head-mounted devices, or other devices with like capability. The client device 106 may include the display 121. The display 121 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client device 106 may include other input/output devices 269 such as a light emitting diode (LED), speaker, microphone, geo-location sensor, and/or other devices.

The client device 106 may be configured to execute various applications such as the client application 115 and/or other applications. The client application 115 may be executed in a client device 106, for example, to access network content served up by the computing environment 109 and/or other servers, thereby rendering a user interface 118 on the display 121. To this end, the client application 115 may comprise, for example, a browser, a dedicated application, etc., and the user interface 118 may comprise a network page, an application screen, etc. The client device 106 may be configured to execute applications beyond the client application 115 such as, for example, email applications, social networking applications, word processors, spreadsheets, and/or other applications. The client application 115 may be configured to synchronize the client device 106 with media content 103 being rendered by the media device 100. For example, if a user is ten minutes into a movie, a timer 272 in the client application on the client device may sync to ten minutes. The timer 272 may be used to generate notification events at certain times of the movie or other media content 103.

Next, a general description of the operation of the various components of the networked environment 200 is provided. To begin, it is assumed a user desires to be warned of particular content in upcoming scenes. For example, a user may desire to be notified in advance of scenes having bad language, violence, adult content, etc. To this end, the client application 115 on a user's client device 106 may generate a user interface 118 that facilitates a selection of content undesirable to the user. The content selected by the user may be communicated to the computing environment 109 as user preferences 252*b*. As may be appreciated, the undesirable content includes content for which the user desires to receive a warning or a notification.

To display warnings or notifications on the client device 106, a synchronization of the client application 115 and the media content 103 may be required. Consequently, the client device 106 of the user may be employed to synchronize a client application 115 with media content 103 being rendered by a media device 100. For example, if a user is ten minutes into a movie, a timer 272 in the client application on the client device may sync to ten minutes. The timer 272 may be used to generate notification events at certain times of the movie or other media content 103.

The computing environment 109 is employed to facilitate the synchronization of the client device 106 with the media content 103. The synchronization between the client device 106 and the media content 103 may be performed using at least one of an audio signal or a video signal captured by the client device 106 during a playback of the media content 103. For example, a client device 106 in proximity of a media device 100 may be configured to detect audio and/or video emitted from the media device 100. In various embodiments, the client device 106 may be configured to capture audio from a movie being shown on a television using a microphone or a similar sensor. In alternative embodiments, the client device 106 may be capable of capturing video (e.g., a picture or a video recording) from a television program shown on the television using a front-facing or rear-facing camera. Alternatively, in various embodiments, if the media device 100 comprises a network-enabled device employed to stream the media content 103, the media content 103 being streamed by the user may be analyzed to determine a scene the user is currently watching. For example, if the user is streaming media content 103 from a media content streaming service, a current playback time of the media content 103 may be analyzed to determine the scene the user is currently watching.

The audio signal and/or the video signal may be used by the computing environment 109 to determine a current scene of the media content 103 being rendered by the media device 100. To this end, the audio signal and/or video signal captured by the client device 106 may be compared to a library of digital fingerprints 242 stored in the data store 209. In various embodiments, the comparison employs pattern matching. For example, assuming the client device 106 communicates an audio signal to the computing environment 109, the audio signal may be converted to a data object comprising frequency, amplitude, and time. The frequency, amplitude, and time may be compared to a library of data objects (e.g., fingerprints 242) to attempt to find a match in the library comprising a same or similar frequency, amplitude, and time. Similarly, fingerprint matching may be used to identify a current scene that the user is currently watching. To this end, the library of digital fingerprints 242 stored in the data store 209 may comprise fingerprints for scenes of media content 103.

Further, the computing environment 109 determines any upcoming scenes in the media content 103. Upcoming scenes may include scenes that will be rendered by the media device 100 at a future time during playback of the media content 103. As a non-limiting example, a movie may have a runtime of two hours. The current scene of the media content 103 identified using the audio signal and/or the video signal may include a start time and an end time. Any scenes in the data store 209 occurring after the end time may be identified as an upcoming scene. In addition, the computing environment 109 may account for time taken for network communication and computer processing, including the processing that occurs when a current scene of the movies is identified.

The upcoming scenes are analyzed by the computing environment 109 to determine types of content included in the upcoming scenes. In various embodiments, the content in a particular scene is identified using tags 248 stored in association with a scene in the data store 209. The tags 248 may be created or vetted using a network site that facilitates a collaboration among users to create and/or vet user-created tags 248. For example, the movie database application 212 may be implemented on a network site enabling users to vote on whether a tag 248 is representative of a scene.

In one embodiment, the movie database application 212 generates one or more user interfaces 118 that display tags 248 created by users for a particular scene of media content 103. Using the user interface 118, if a tag 248 is representative or descriptive of a scene, a user may engage an "up-vote" component. Alternatively, if the tag 248 is a poor description of a scene, the user may engage a "down-vote" component. A metric may be associated with each of the tags 248 such that, when a user engages the up-vote component or the down-vote component, a metric for a particular tag 248 may be incremented or decremented, respectively. By incrementing or decrementing a metric associated with a tag 248 when a user engages a voting component, the tags 248 associated with a proportionately high metric may be used in determining content.

As a non-limiting example, assuming a tag 248 has a label "violence," a substantial amount of up-votes compared to a small amount of down-votes may be indicative that the content of the scene comprises "violence." Tags 248 having a metric or a ratio of votes meeting or exceeding a predefined threshold may be used in determining content in the upcoming scenes. The predefined threshold may include a metric configured by an administrator that is indicative of a reliability of the particular tag 248.

If the content identified in the upcoming scenes matches content selected by the user, a notification event is generated by the computing environment 109 for communication to the client device 106. In various embodiments, the computing environment 109 may generate a command comprising an action to be performed by the client device 106, such as causing the client device 106 to vibrate, rendering a notification in a display 121 of the client device 106, and/or causing a tone or audio signal to be emitted from a speaker of the client device 106. The notification event may be determined based on the user preferences **252*a*** established by the user as well as settings created by an administrator.

Further, the command may include a timestamp or a time interval during which the notification event should occur in the client device 106. For example, the notification event may occur during an entirety of a scene from a start time of the scene until an end time of the scene. In alternative embodiments, the notification event may occur only at the start of the scene. In some embodiments, the notification event may occur only at a predefined time before the start of the scene. Upon receipt, the client application 115 may perform the notification event set forth in the command at the time interval designated by the notification event.

In various embodiments, the user of the client device 106 may be monitored to ensure that the user is not watching the media content 103 being rendered in the media device 100. For example, a front-facing camera of the client device 106 may be employed to detect eye position for a user of the client device 106. In other embodiments, the user may be required to press and hold a user interface component (e.g., a button) for an entirety of the scene. In other embodiments, the user may be required to go to a different location, where the location of the user is verified using geo-location of the client device 106.

Figure 3:
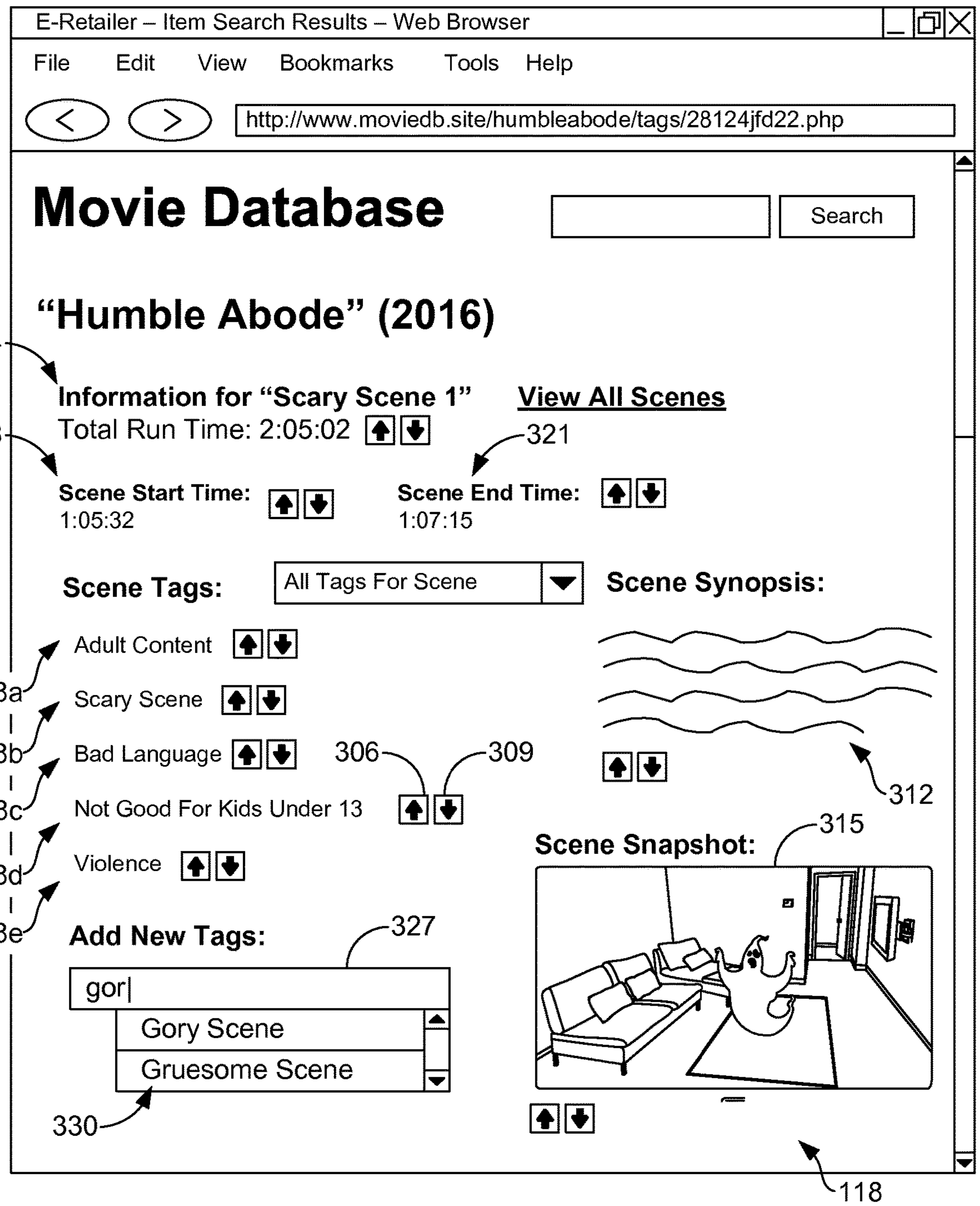
FIG. 3 is a drawing of an example user interface that facilitates collaboration among users to vet user-defined information for scenes of media content of FIG. 1 according to various embodiments of the present disclosure.

Moving on to FIG. 3, shown is a drawing of an example user interface 118 that facilitates collaboration among users to vet information provided by users for scenes of media content 103 (FIG. 1). According to various embodiments of the present disclosure, the user interface 118 of FIG. 3 may be generated by the movie database application 212 (FIG. 2) for access via a network site.

In the non-limiting example of FIG. 3, a user interface 118 is generated comprising tags **248*a* . . . 248*e* (collectively tags 248) for a movie entitled "Humble Abode." The movie database application 212 generates the user interface 118 that displays tags 248 created by users for a particular scene of media content 103. In addition, other information for a scene may be submitted by users, including, but not limited to, a scene start time, a scene end time, a synopsis, a scene snapshot, and/or other information Using the user interface 118, if a tag 248 is representative or descriptive of a scene, a user may engage an "up-vote" component 306. Alternatively, if the tag 248 is a poor description of a scene, the user may engage a "down-vote" component 309. A metric may be associated with each of the tags 248 in the data store 209 (FIG. 2) such that, when a user engages the up-vote component 306 or the down-vote component 309, a metric for a particular tag 248 may be incremented or decremented, respectively. By incrementing or decrementing a metric associated with a tag 248 when users engage a voting component, the tags 248** associated with a proportionately high metric may be used in determining content.

For example, assuming a tag 248 has a label "not good for kids under 13" with a substantial amount of up-votes relative to a small amount of down-votes. This may be indicative that the content of the scene is "not good for kids under 13." Tags 248 having a metric or a ratio of votes meeting or exceeding a predefined threshold may be used in determining content in the upcoming scenes.

The up-vote component 306 and/or the down-vote component 309 may also be used to vet a scene synopsis 312, a scene snapshot 315 (e.g., a single frame of the scene representative of an event occurring in the scene), a scene start time 318, a scene end time 321, a total run time 324 for the media content 103, etc. In addition, the user interface 118 may facilitate a creation of new tags 248 using an "add new tag" component 327. In various embodiments, the add new tag component 327 may include a suggestion component 330 that suggests tags 248 to the user as the user inputs text in a textbox of the component.

Figure 4A:
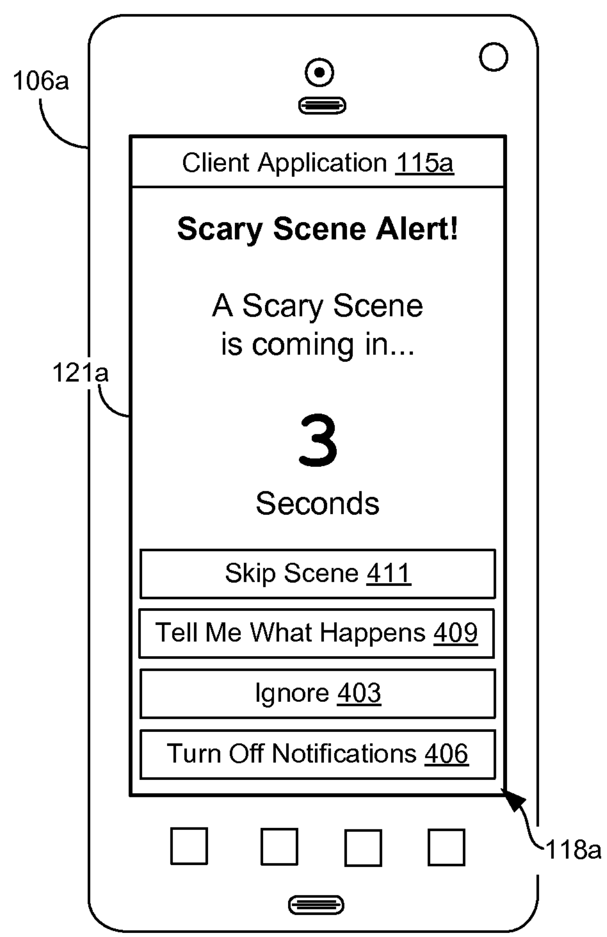
FIGS. 4A-4D are drawings of example user interfaces rendered by the client device in the networked environment of FIG. 1 according to various embodiments of the present disclosure.

Referring next to FIG. 4A, shown is a drawing of an example user interface 118*a* rendered by client application 115*a* on the client device 106*a* according to various embodiments of the present disclosure. In the non-limiting example of FIG. 4A, the client application 115*a* is executed on the client device 106*a* to notify a user of an forthcoming warning or notification. As may be appreciated, the notification may have been requested by the user to warn the user of an upcoming scene of a movie or other media content 103. For example, if a user wants to be warned of "scary scenes" in a movie, the notification may be shown to the user in the display 121*a* a predefined amount of time (e.g., three seconds) before a scary scene occurs in the movie.

The user may ignore the warning and remove it from the user interface 118*a* by manipulating an ignore component 403 in the user interface 118*a*. Similarly, if the user does not want to see additional notifications, such as the one shown in FIG. 4A, the user may manipulate the turn off notifications component 406. In some embodiments, the user may desire to read a synopsis of what occurs in the scene as the user chooses not to watch the scene. Accordingly, by manipulating the "tell me what happens" component 409, a series of one or more user interfaces 118 may be generated to show the user a synopsis and/or other information associated with the scene. Also, in various embodiments, the client application 115 may cause a fast forward or a skip of a particular scene on the media device 100. For example, by manipulating the "skip scene" component 411, the notification application 100 may communicate with a streaming service and/or a network-enabled media device 100 to cause a fast forward or a skip to a subsequent scene of the media content 103.

Figure 4B:
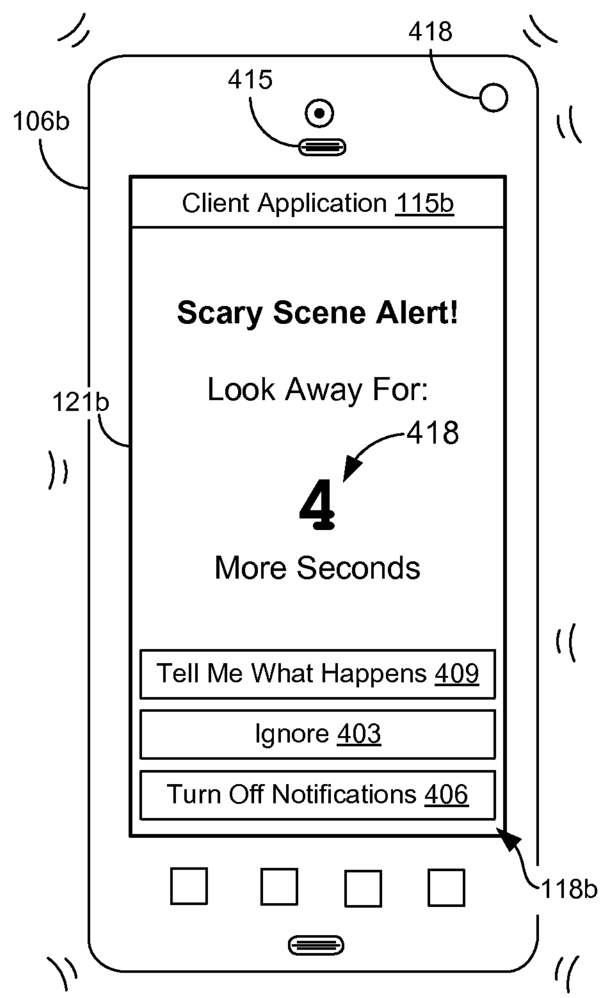

Turning now to FIG. 4B, shown is a drawing of another example user interface 118*b* rendered by client application 115*b* on the client device 106*b* according to various embodiments of the present disclosure. In the non-limiting example of FIG. 4B, the client application 115*b* is executed on the client device 106*b* to perform a notification event, such as causing the client device 106*b* to vibrate, rendering a notification in the display 121*b* of the client device 106*b*, causing a tone or audio signal to be emitted from a speaker 415 of the client device 106*b*, and/or illuminating an LED 418 of the client device 106*b*. As may be appreciated, the notification may be requested by the user to warn the user during an entirety of a playback of a scene of a movie. For example, if a user wants to be warned during an entirety of a "scary scene," the notification may be shown to the user in the display 121*b* until the scary scene ends. A clock may countdown the time until the current scene terminates.

The user may ignore the warning, and remove it from the user interface 118*b*, by manipulating the ignore component 403 in the user interface 118*b*. Similarly, if the user does not want to see additional notifications, such as the one shown in FIG. 4B, the user may manipulate the turn off notifications component 406. In some embodiments, the user may desire to read a synopsis of what occurs in the scene as the user may choose not to watch the scene. Accordingly, by manipulating the "tell me what happens" component 409, a series of one or more user interfaces 118 may be generated to show the user a synopsis.

Figure 4C:
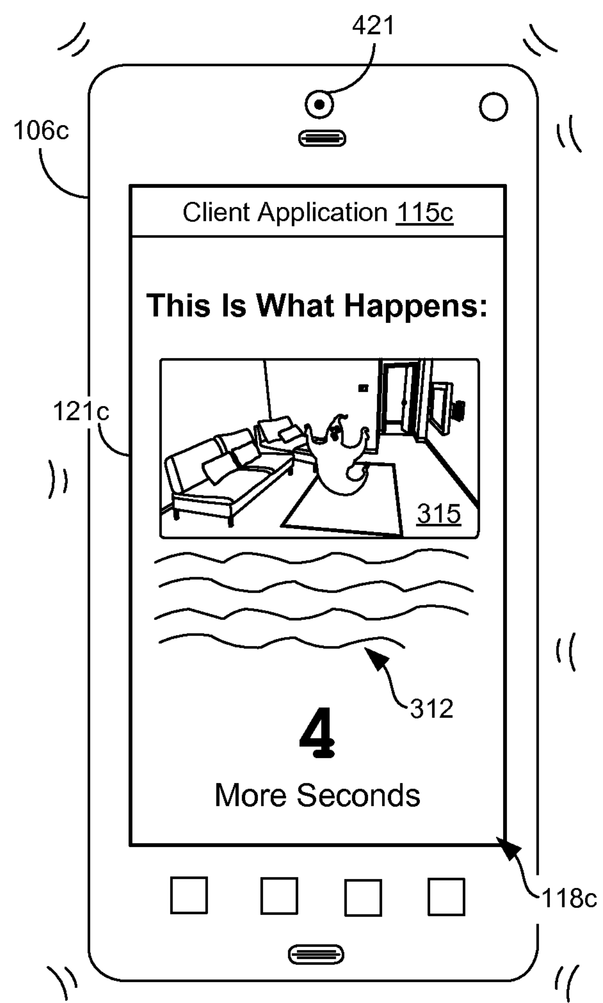

Referring now to FIG. 4C, shown is a drawing of another example user interface 118*c* rendered by client application 115*c* on the client device 106*c* according to various embodiments of the present disclosure. In the non-limiting example of FIG. 4C, the client application 115*c* is executed on the client device 106*c* to perform a notification event, such as causing the client device 106*b* to vibrate, as well as to show a scene synopsis 312 of the scene in the display 121*c*. In various embodiments, the user interface 118*c* of FIG. 4C may be shown in response to a manipulation of the "tell me what happens" component 409 (FIGS. 4A-4B). In addition, a scene snapshot 315 may be shown such that the user has a visual representation of what occurs during the scene. As may be appreciated, the scene synopsis 312 and the scene snapshot 315 may be generated and vetted by users of the movie database application 212 (FIG. 2), as shown in FIG. 3.

Figure 4D:
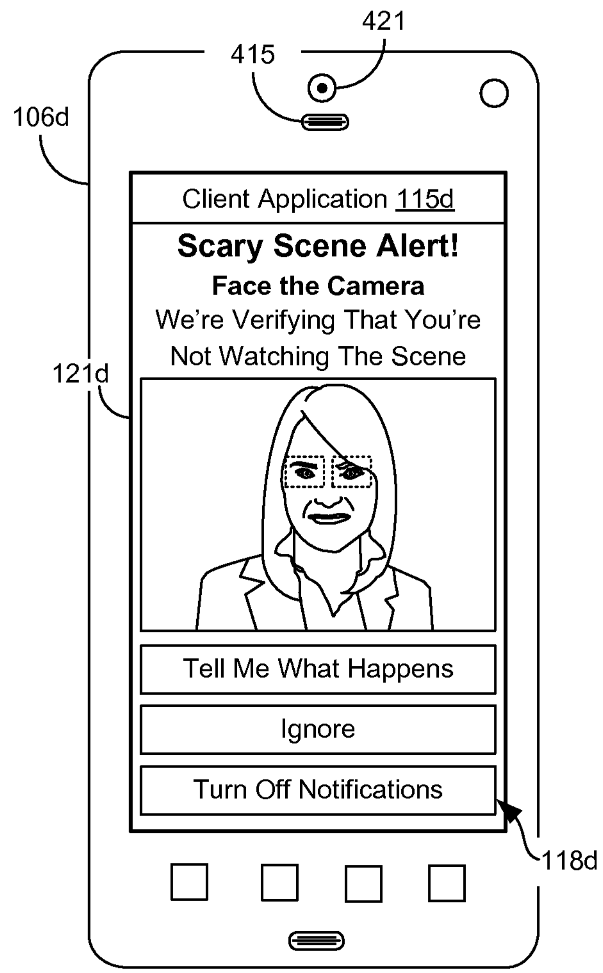

Referring now to FIG. 4D, shown is a drawing of another example user interface 118*d* rendered by client application 115*d* on the client device 106*d* according to various embodiments of the present disclosure. In various embodiments, the user of the client device 106 may be monitored to ensure that the user is not watching the media content 103 (FIG. 1) being rendered in the media device 100 (FIG. 1). For example, a front-facing camera 421 of the client device 106*d* may be used to detect eye movement for a user of the client device 106*d*. If the eyes are not directed toward the front-facing camera 421, the client application 115*d* or the computing environment 109 (FIG. 1) may be configured to perform a remedial action.

In various embodiments, the remedial action includes increasing an audible level of a tone emitted by the client device 106*d* via the speaker 415. Similarly, in other embodiments, a vibration level of a vibration motor in the client device 106*d* may be augmented. In various embodiments, a parent may establish parental settings in the client application 115*d* that require the parent to be notified if children are watching certain type of content (e.g., adult content, violence, bad language). Accordingly, if a child is not looking at the front-facing camera 421, the parent may be notified via email, simple message service (SMS), instant message, or a similar medium of communication.

Figure 5A:
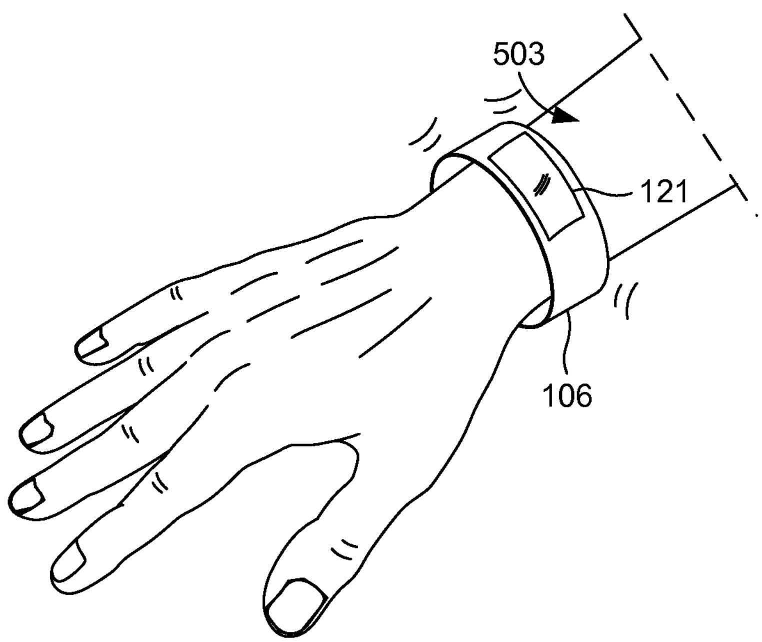
FIGS. 5A-5C are drawings of other client devices that may be employed in the networked environment of FIG. 1 according to various embodiments of the present disclosure.

With respect to FIG. 5A, shown is a drawing of another example of a client device 106 according to various embodiments of the present disclosure. In various embodiments, the client device 106 may include a smart watch or other electronic device that is capable of being worn by a person 503. In various embodiments, the smart watch may include a display 121. A notification event may be communicated to the client device 106 of FIG. 5A over a network. To this end, a notification event may be tailored to a type of the client device 106 such that a proper notification may be communicated to the wearer. In the non-limiting example of FIG. 5, the client device 106 is performing a vibration in anticipation of or during a scene of media content 103. In other embodiments, the display 121 of the device may be used to render a notification in the display 121.

Figure 5B:
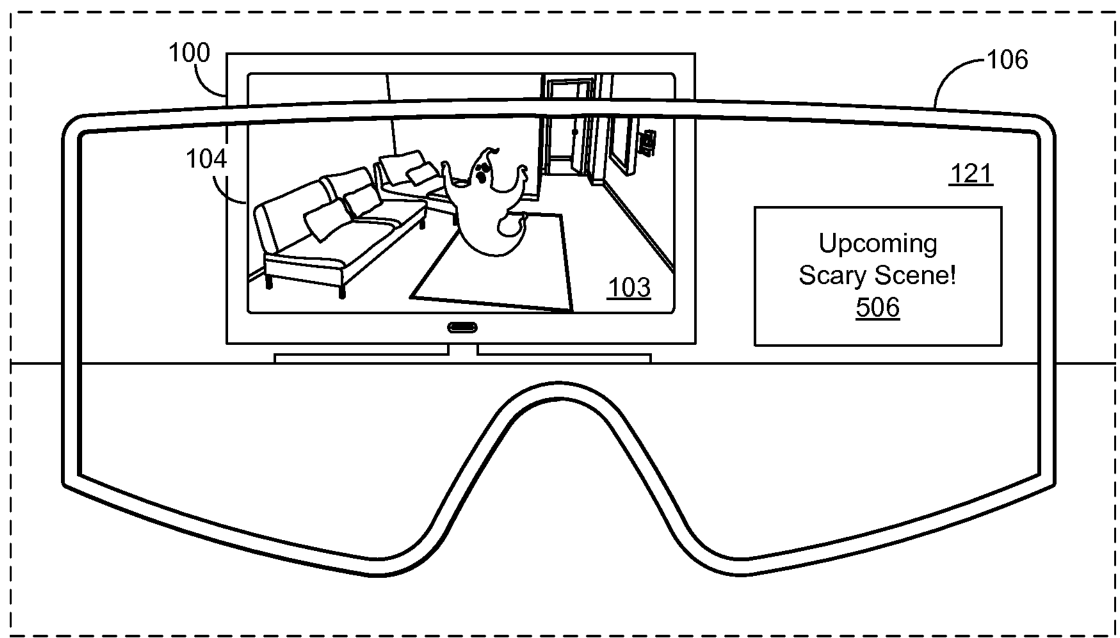
Figure 5C:
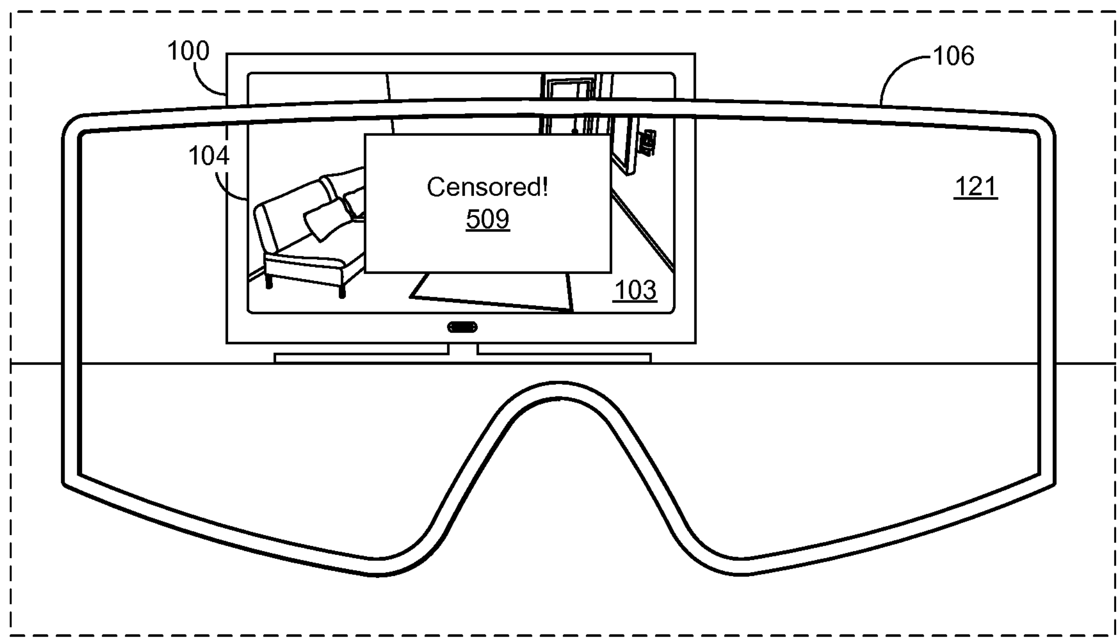

Moving on to FIGS. 5B-5C, shown are drawings of a client device 106 comprising a virtual reality head-mounted device which may be worn on a face of a user according to various embodiments of the present disclosure. A virtual reality head-mounted device may include a front-facing camera. A client application 115 (FIG. 1) is executed on the client device 106 to cause a rendering of visual content captured by the front-facing camera in the display 121. Additionally, the client application 115 may cause various user interface components to be rendered in the display 121 of the client device 106 in association with the visual content captured by the front-facing camera. For example, by knowing a current scene of the media content 103, the computing environment 109 (FIG. 1) may identify upcoming scenes having content predefined by the user. Before an upcoming scene of the media content 103 is shown in the media device 100, the client application 115 may perform one or more notification events in order to warn or otherwise get the attention of the user wearing the virtual reality head-mounted device. In the non-limiting example of FIG. 5B, a region 506 of the display may comprise a notification that attempts to notify the user that an upcoming scene comprises scary content.

In the non-limiting example of FIG. 5C, a region 509 of the content being rendered in the display 121 is censored based on criteria defined by the user. For example, assuming the user has indicated that the user wants to avoid scary content, any regions 509 having scary content may be censored by the client device 106. As may be appreciated, a user not wearing the client device 106 may be able to see the region 509 of the media content 103 in the media device 100 as it is only censored on the display 121 of the client device 106. Although only a portion of the media content 103 is being censored in the non-limiting example of FIG. 5C, in some embodiments, an entirety of the media content 103 may be censored. This may include causing the audio and/or the video to be manipulated or removed during a particular scene.

To censor the region 509 in the display 121, the media content 103 being rendered on the media device 100 may be transcoded such that only the client device 106 is able to interpret and censor the region 509. To this end, the notification application 215 may be configured to communicate with one or more streaming services to transcode regions 509 in a scene of upcoming content prior to the media content 103 being rendered on the media device display 104. Similarly, the region 509 of the media device display 104 may be censored for other devices, such as three-dimensional (3D) glasses. For example, the media content 103 being rendered on the media device 100 may be transcoded such that only 3D glasses are able to censor the region 509 or view regions beyond the censored region 509.

Figure 6:
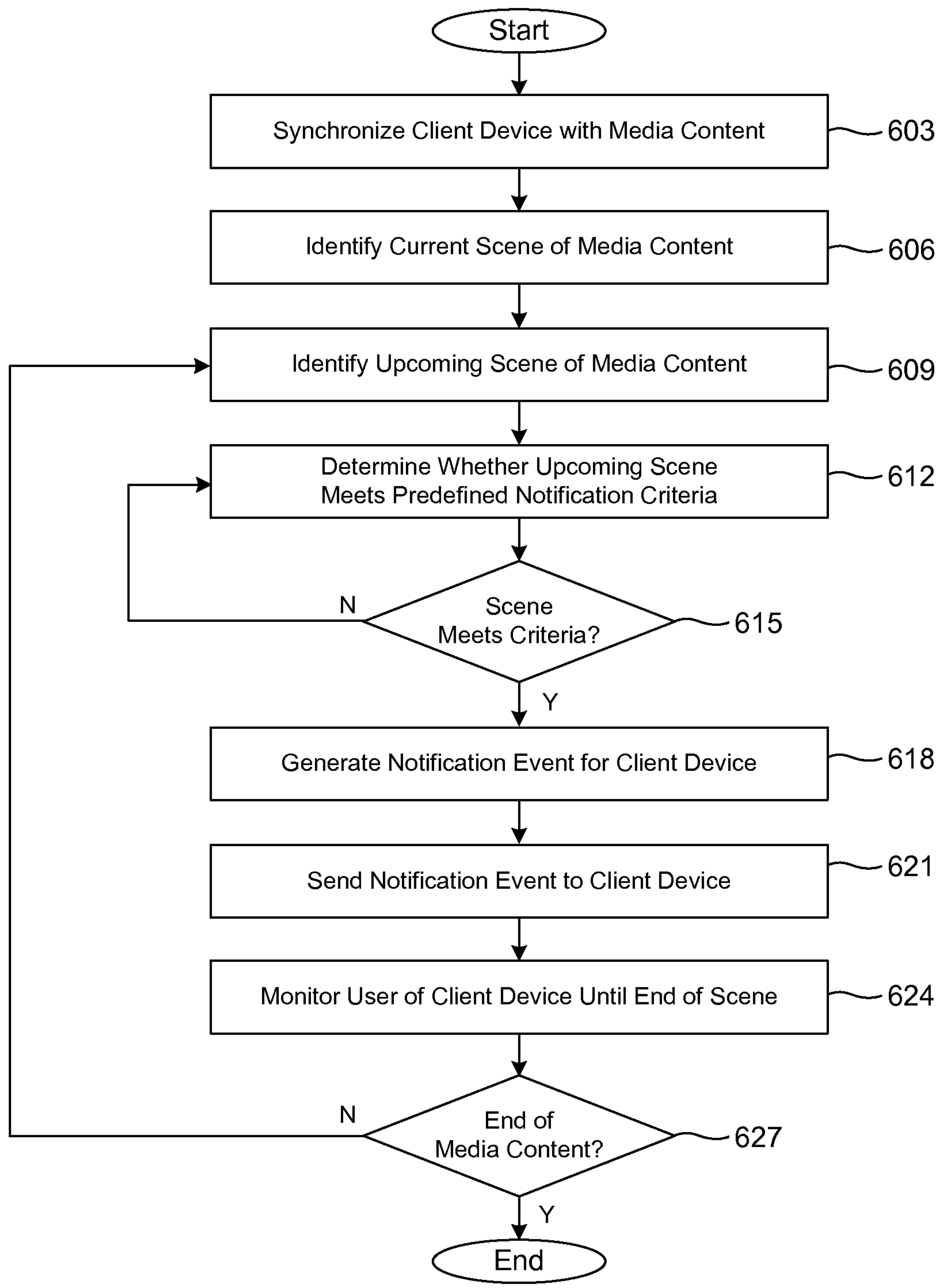
FIG. 6 is a flowchart illustrating one example of functionality implemented as portions of a notification application executable in a computing environment in the networked environment of FIG. 2 according to various embodiments of the present disclosure.

Referring next to FIG. 6, shown is a flowchart that provides one example of the operation of a portion of the notification application 215 according to various embodiments. It is understood that the flowchart of FIG. 6 provides merely an example of the many different types of functional arrangements that may be employed to implement the operation of the portion of the notification application 215 as described herein. As an alternative, the flowchart of FIG. 6 may be viewed as depicting an example of elements of a method implemented in the computing environment 109 (FIG. 1) according to one or more embodiments.

Beginning with 603, the computing environment 109 is employed to synchronize the client device 106 (FIG. 1) with media content 103 (FIG. 1) being rendered by a media device 100 (FIG. 1). For example, if a user is thirty minutes into a movie, a timer 272 (FIG. 2) in the client application on the client device may sync to thirty minutes. The timer 272 may be used to generate notification events at certain times of the movie. In various embodiments, the media content 103 includes a movie, an episode of a television show, a song, a music album, or other similar content. In some embodiments, the synchronization between the client device 106 and the media content 103 is performed using at least one of an audio signal or a video signal captured by the client device 106 during a playback of the media content 103. For example, a client device 106 in proximity of a media device 100 may be configured to detect audio and/or video emitted from the media device 100. In various embodiments, the client device 106 may be configured to capture audio from a movie being shown on a television using a microphone or a similar sensor. In alternative embodiments, the client device 106 may be capable of capturing video (e.g., a picture or a video recording) from a television show being shown on the television using a front-facing or rear-facing camera.

Next, in 606, a current scene of the media content 103 being rendered by the media device 100 is determined. In some embodiments, determining a current scene of the media content 103 includes first identifying the media content 103. To this end, the audio signal and/or video signal captured by the client device 106 may be compared to a library of digital fingerprints 242 (FIG. 2) stored in the data store 209 (FIG. 2). In various embodiments, the comparison employs pattern matching. For example, assuming the client device 106 communicates an audio signal to the computing environment 109, the audio signal may be converted to a data object comprising frequency, amplitude, and time. The frequency, amplitude, and time may be compared to a library of data objects (e.g., fingerprints 242) to attempt to find a match in the library comprising the same or similar frequency, amplitude, and time. Similarly, in 606, fingerprint matching may be used to identify a current scene that the user is currently watching. To this end, the library of digital fingerprints 242 stored in the data store 209 may comprise fingerprints for scenes of media content 103.

Next, in 609, knowing a current scene of the media content 103 is being rendered by the media device 100, upcoming scenes may be identified. Upcoming scenes may include scenes that will be rendered by the media device 100 at a future time during playback of the media content 103. As a non-limiting example, a movie may have a runtime of two hours. The scene identified in 606 that is currently being rendered by the media device 100 may be associated with a start time and an end time. Any scenes in the data store 209 occurring after the end time and before the two-hour runtime may be defined as an upcoming scene.

In 612, the upcoming scenes are analyzed to determine types of content included in the upcoming scenes. In various embodiments, the content in a particular scene is identified using tags 248 (FIG. 2) stored in association with media content 103 in the data store 209. The tags 248 may be created or vetted using a network site that facilitates a collaboration among users to create and/or vet user-created tags 248. For example, the movie database application 212 (FIG. 2) may enable users to vote on whether a tag 248 is representative of a scene. In one embodiment, a user interface 118 (FIG. 1) may be generated to show tags 248 created by users for a particular scene associated with media content 103. Using the user interface 118, if a tag 248 is representative or descriptive of a scene, a user may engage an "up-vote" component 306 (FIG. 3). Alternatively, if the tag 248 is a poor description of a scene, the user may engage a "down-vote" component 309 (FIG. 3). A metric may be associated with each of the tags 248 such that, when a user engages the up-vote component 306 or the down-vote component 309, a metric for a particular tag 248 may be incremented or decremented, respectively.

By incrementing or decrementing a metric associated with a tag 248 when users engage a voting component, the tags 248 associated with a proportionately high metric may be used in determining content. For example, assuming a tag 248 has a label "violence," a substantial amount of up-votes compared to a small amount of down-votes may be indicative that the content of the scene comprises "violence." Tags 248 having a metric or a ratio of votes meeting or exceeding a predefined threshold may be used in determining content in the upcoming scenes. The predefined threshold may include a metric configured by an administrator that is indicative of a reliability of the particular tag 248.

Next, in 615, it is determined where the content in the upcoming scenes satisfy criteria predefined by a user of the client device 106. As shown in FIG. 1, the user interface 118 may facilitate a selection of undesirable content by the user to be communicated to the computing environment 109. The undesirable content may include content for which the user desires to receive a warning or a notification. If the content identified in the upcoming scenes does not match any content selected by the user, the process may revert to 609 to continue identifying any upcoming scenes.

However, if the content identified in the upcoming scenes matches content selected by the user, the process proceeds to 618 where a notification event is generated for communication to the client device 106. In various embodiments, the computing environment 109 may generate a command comprising an action to be performed by the client device 106, such as causing the client device 106 to vibrate, rendering a notification in a display 121 (FIG. 1) of the client device 106, and/or causing a tone or audio signal to be emitted from a speaker of the client device 106. The notification event may be determined based on preferences provided by the user and/or settings established by an administrator.

Further, the command may comprise, for example, a time during which the notification event should occur in the client device 106. For example, the notification event may occur during an entirety of a scene from a start time of the scene until an end time of the scene. In alternative embodiments, the notification event may occur only at the start of the scene. In some embodiments, the notification event may occur only at a predefined time before the start of the scene. In 621, the notification event is communicated to the client device 106. Upon receipt, the client application 115 may perform the notification event set forth in the command according to the time during which the notification event is scheduled to occur in the client device 106.

In various embodiments, the user of the client device 106 may be monitored, in 624, to ensure that the user is not watching the media content 103 (FIG. 1) being rendered in the media device 100 (FIG. 1). For example, a front-facing camera of the client device 106 (if applicable) may be used to detect eye movement of the client device 106. In other embodiments, the user may be required to press and hold a user interface component (e.g., a button) for an entirety of the scene. In other embodiments, the user may be required to go to a different location, wherein the location of the user is verified using geo-location.

Finally, in 627, it is determined whether the end of the media content 103 has been reached such that there are no additional upcoming scenes. If the end of the media content 103 has yet to be reached, the process may revert to 609 to continue identification of upcoming scenes in the media content 103. However, if the end of the media content 103 has been reached, the process may proceed to end.

Figure 7:
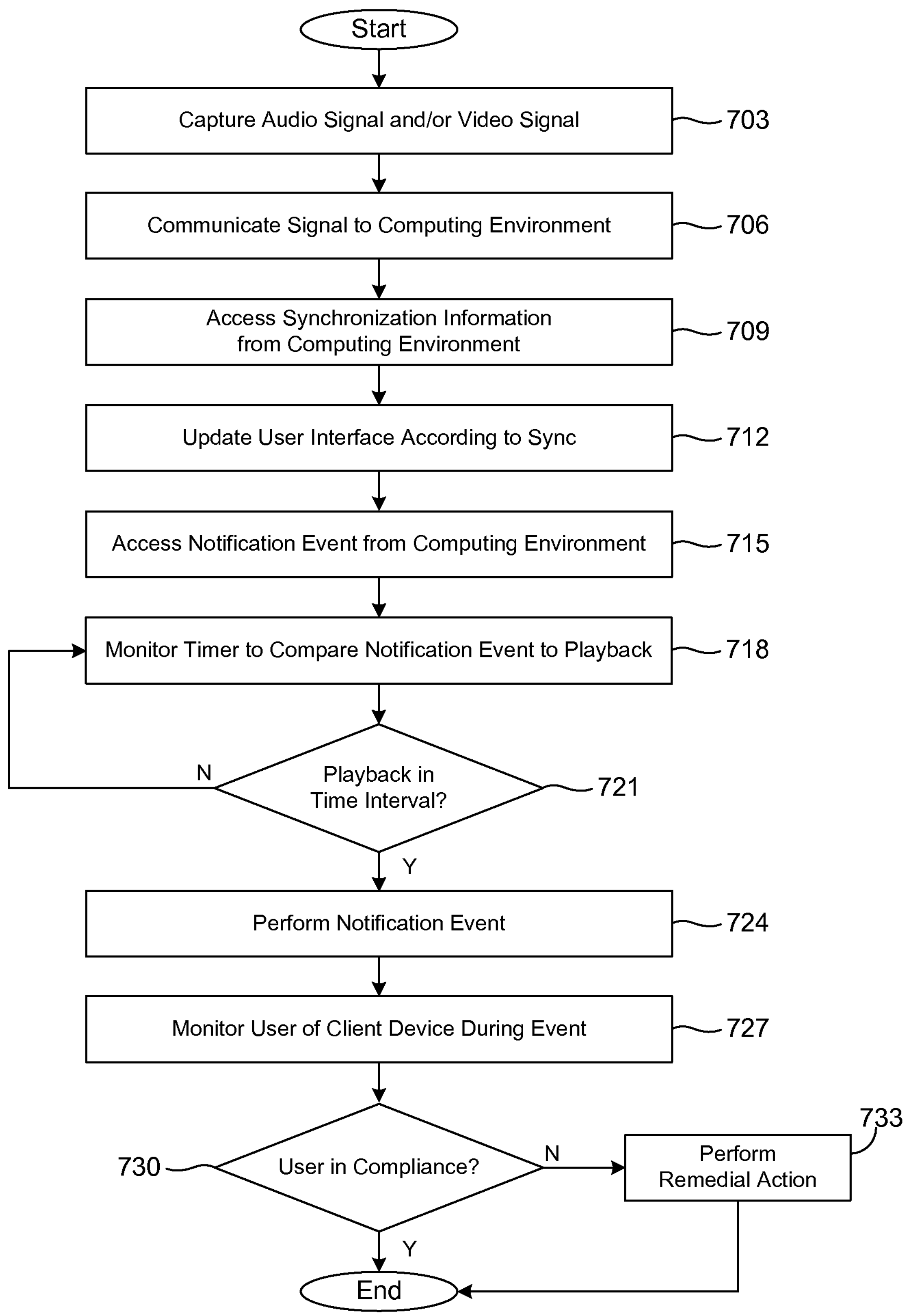
FIG. 7 is a flowchart illustrating one example of functionality implemented as portions of a client application executable in a computing environment in the networked environment of FIG. 2 according to various embodiments of the present disclosure.

Referring next to FIG. 7, shown is a flowchart that provides one example of the operation of a portion of the client application 115 according to various embodiments. It is understood that the flowchart of FIG. 7 provides merely an example of the many different types of functional arrangements that may be employed to implement the operation of the portion of the client application 115 as described herein. As an alternative, the flowchart of FIG. 7 may be viewed as depicting an example of elements of a method implemented in the computing environment 109 (FIG. 1) according to one or more embodiments.

Beginning with 703, the client application 115 (FIG. 1) is employed to capture an audio signal and/or a video signal from media content 103 (FIG. 1) being rendered by a media device 100 (FIG. 1). As noted above, the audio signal and/or the video signal captured by the client application 115, or a similar application, may be used to synchronize at least one client device 106 (FIG. 1) with media content 103 being rendered by the media device 100. For example, if a user is forty-five minutes into a movie, a timer 272 (FIG. 2) in the client application 115 on the client device 106 may sync to forty-five minutes.

In various embodiments, the client application 115 is configured to capture the audio signal while the client device 106 is not in use. For example, a client device 106 in proximity of a media device 100 may be configured to detect audio emitted from the media device 100 using a microphone of the client device 106. In alternative embodiments, the client application 115 may facilitate a capture of a picture or video recording of a portion of the media content 103 being rendered by the media device 100 using a front-facing or rear-facing camera of the client device 106, if applicable. In 706, the audio signal and/or the video signal is communicated to the computing environment 109 for analysis.

The computing environment 109 is employed to determine a current scene and/or playtime of the media content 103. As a result, in 709, synchronization information is received from the computing environment 109 to synchronize the client application 115 with the media content 103 being rendered by the media device 100. In various embodiments, a timer 272 in the client application 115 may be set to a playtime of the media content 103. To this end, the timer 272 may be used to perform a notification event at a predefined time during playback of the media content 103. In 712, one or more user interfaces 118 (FIG. 1) rendered by the client application 115 may be updated according to the synchronization. For example, the playback components 127 (FIG. 1) may be updated to reflect the current time in the playback of the media content 103.

The computing environment 109 is also employed to determine whether content in any upcoming scenes matches criteria set by the user for which the user wants to be warned. For example, the content in a particular scene is identified by the computing environment 109 using tags 248 (FIG. 2) stored in association with media content 103 in the data store 209 (FIG. 2). To this end, in 715, the client application 115 may access notification events received by the client device 106 from the computing environment 109. The notification events may be stored in memory local to the client device 106.

Further, the notification events may be performed by the client application 115 at a predefined time during playback of the media content 103. Consequently, in 718, the timer 272 is monitored to compare a playback time of the media content 103 to the notification events stored in memory local to the client device 106. Similarly, in 721, it may be determined whether a current time of the playback is in a time interval designated in the notification event. For example, a particular notification event may indicate that a vibration is to occur three seconds before a violent scene in the media content 103 and is to continue vibrating during an entirety of the scene. This may help to warn the user of the upcoming scene as well as to notify the user when the scene ends (e.g., when the vibration of the client device 106 terminates). The notification event may set forth the time in the playback when the notification should occur. If the timer 272 corresponding to the playback of the media content 103 is that of the time set forth in the notification event, or is within a time interval, in 724, an action designated in the notification event may occur. For example, the client application 115 may cause the vibration to occur on the client device 106.

In various embodiments, in 727, the user of the client device 106 may be monitored to ensure that the user is not watching the media content 103 being rendered in the media device 100. For example, a front-facing camera of the client device 106 (if applicable), may be used to detect eye movement of the client device 106. In other embodiments, the user may be required to press and hold a user interface component (e.g., a button) for an entirety of the scene. In other embodiments, the user may be required to go to a different location, wherein the location of the user is verified using geo-location. The monitored information may be communicated to the computing environment 109 for remote processing and/or the client application 115 may be configured to determine whether the user is in compliance with predefined criteria set by the user of the client device 106.

Accordingly, in 730, it is determined whether the user is in compliance with the notification event or other predefined settings established by one or more users of the client device 106. If the user is in compliance (e.g., the user is looking at the client device 106 and not the media device 100), the process may proceed to end. However, if the user is not in compliance (e.g., the user is not looking at the client device 106), the process may proceed to 733 where a remedial action may be performed, if necessary. In various embodiments, an audible level of a tone emitted by the client device 106 may be increased. Similarly, in other embodiments, a vibration level of a vibration motor in the client device 106 may be augmented. In various embodiments, a parent may establish parental settings in the client application 115 that require the parent to be notified if children are watching certain type of content (e.g., adult content, violence, bad language). Accordingly, if a child is not in compliance with the parental settings on the child's client device 106, the parent may be notified via email, SMS, instant message, or a similar medium of communication. After the remedial action is performed in 733, the process proceeds to end.

Figure 8:
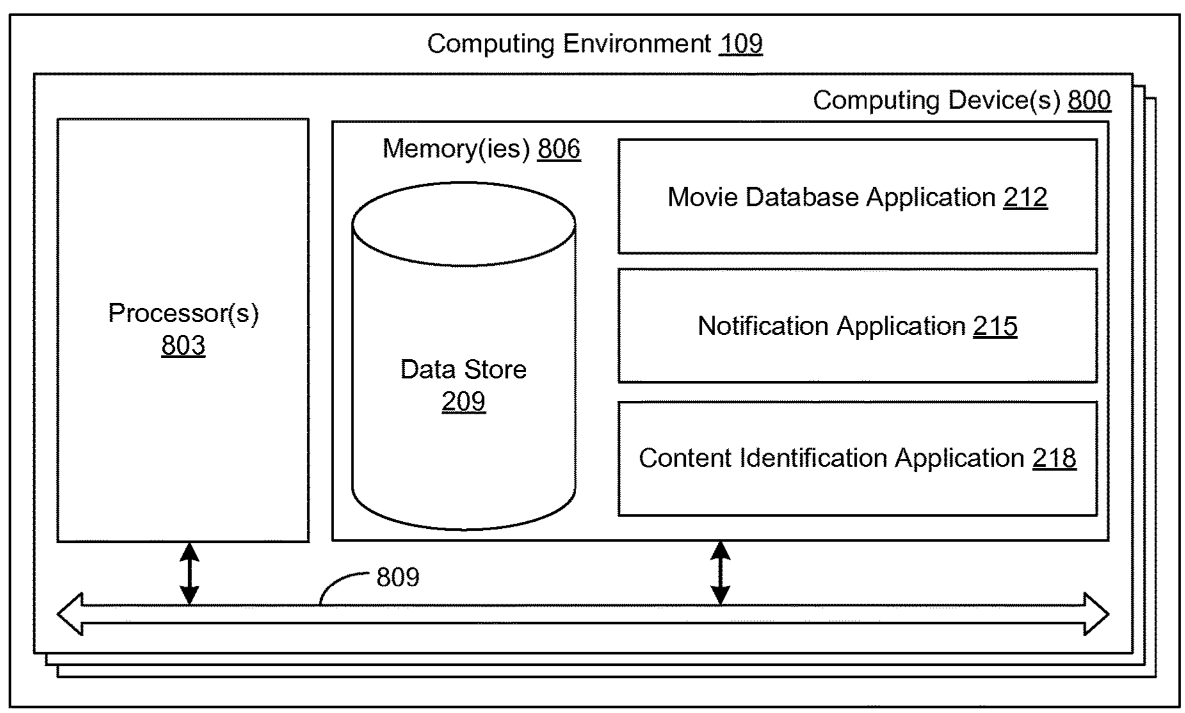
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 109 according to an embodiment of the present disclosure. The computing environment 109 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the movie database application 212, the notification application 215, the content identification application 218, and potentially other applications. Also stored in the memory 806 may be a data store 209 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the movie database application 212, the notification application 215, the content identification application 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6 and 7 show the functionality and operation of an implementation of portions of the notification application 215 and the client application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the movie database application 212, the notification application 215, the content identification application 218, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the movie database application 212, the notification application 215, and/or the content identification application 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices in the same computing environment 109. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method, comprising:

capturing, by a client device comprising at least one hardware processor, an audio signal or a video signal associated with media content being rendered on a media device;

communicating, by the client device, the audio signal of the video signal to a remote computing device to identify a current scene of the media content the remote computing device being configured to identify the current scene of the media content using the audio signal or the video signal captured by the client device;

in response to the current scene of the media content being identified by the remote computing device, display a user interface that comprises at least one tag describing content about which a notification is generated on the client device;

receiving, by the client device, user input comprising a selection of the at least one tag describing the content;

accessing, by the client device, a notification event from the remote computing device to be performed in association with at least one of a plurality of upcoming scenes in the media content, the notification event being received by the client device in response to the at least one of the plurality of upcoming scenes being associated with a descriptive tag matching the selection of the at least one tag, the plurality of upcoming scenes to be rendered after the current scene in a playback of the media content; and synchronizing, bythe client device, a timer of the client device with the media content using synchronization data obtained from the remote computing device, the synchronization data communicated to the client device in response to receiving the audio signal or the video signal by the remote computing device.

* * * * *